(12) United States Patent
Becker et al.

(10) Patent No.: US 9,134,339 B2
(45) Date of Patent: Sep. 15, 2015

(54) DIRECTED REGISTRATION OF THREE-DIMENSIONAL SCAN MEASUREMENTS USING A SENSOR UNIT

(71) Applicant: FARO Technologies, Inc., Lake Mary, FL (US)

(72) Inventors: Reinhard Becker, Ludwigsburg (DE); Martin Ossig, Tamm (DE); Bernd-Dietmar Becker, Ludwigsburg (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 14/494,887

(22) Filed: Sep. 24, 2014

(65) Prior Publication Data

US 2015/0085301 A1    Mar. 26, 2015

(30) Foreign Application Priority Data

Sep. 24, 2013   (DE) .................. 10 2013 110 581

(51) Int. Cl.
| | |
|---|---|
| *G01B 11/24* | (2006.01) |
| *G01P 15/00* | (2006.01) |
| *G01B 11/26* | (2006.01) |
| *G01C 3/06* | (2006.01) |
| *G01C 15/00* | (2006.01) |

(Continued)

(52) U.S. Cl.
CPC .............. *G01P 15/00* (2013.01); *G01B 11/002* (2013.01); *G01B 11/26* (2013.01); *G01C 3/06* (2013.01); *G01C 15/002* (2013.01); *G01S 7/4817* (2013.01); *G01S 17/023* (2013.01); *G01S 17/08* (2013.01); *G01S 17/89* (2013.01); *G06T 7/0024* (2013.01); *G01B 11/005* (2013.01)

(58) Field of Classification Search
CPC ................ B60R 2021/2765; B60R 2022/288; B60R 2022/4685
USPC ......... 382/100–156; 356/489, 502, 5.01, 475, 356/445, 608
See application file for complete search history.

(56) References Cited

U.S. PATENT DOCUMENTS

| | | | |
|---|---|---|---|
| 4,357,833 | A | 11/1982 | Wiklund et al. |
| 5,337,149 | A | 8/1994 | Kozah et al. |

(Continued)

FOREIGN PATENT DOCUMENTS

| | | |
|---|---|---|
| DE | 10155488 A1 | 5/2003 |
| DE | 102009010465 B3 | 5/2010 |

(Continued)

OTHER PUBLICATIONS

Notification of Transmittal of the International Search Report and the Written Opinion of the International Searching Authority, or the Declaration; PCT/US2014/057159; Jan. 9, 2015, 11 Pages.

(Continued)

*Primary Examiner* — Gregory J Toatley
*Assistant Examiner* — Iyabo S Alli
(74) *Attorney, Agent, or Firm* — Cantor Colburn LLP

(57) ABSTRACT

A laser scanner measures 3D coordinates from a first position and a second position and uses a sensor unit that includes at least an accelerometer and gyroscope to register the 3D coordinates, the registration based at least in part on comparison to a measured sensor displacement to a preferred displacement value.

12 Claims, 3 Drawing Sheets

(51) Int. Cl.
  *G01S 17/89* (2006.01)
  *G06T 7/00* (2006.01)
  *G01S 17/02* (2006.01)
  *G01S 17/08* (2006.01)
  *G01S 7/481* (2006.01)
  *G01B 11/00* (2006.01)

(56) References Cited

U.S. PATENT DOCUMENTS

| | | | |
|---|---|---|---|
| 5,557,397 A | 9/1996 | Hyde et al. | |
| 5,644,139 A * | 7/1997 | Allen et al. | 250/557 |
| 5,850,289 A | 12/1998 | Fowler et al. | |
| 5,902,968 A | 5/1999 | Sato et al. | |
| 5,912,739 A | 6/1999 | Fowler et al. | |
| 5,956,660 A | 9/1999 | Neumann | |
| 6,128,086 A | 10/2000 | Fowler et al. | |
| 6,427,354 B1 | 8/2002 | Vepsalainen | |
| 6,492,981 B1 | 12/2002 | Stork et al. | |
| 6,608,913 B1 | 8/2003 | Hinton et al. | |
| 6,759,979 B2 | 7/2004 | Vashisth et al. | |
| 7,180,072 B2 | 2/2007 | Persi et al. | |
| 7,228,230 B2 | 6/2007 | Hirokawa | |
| 7,310,889 B2 | 12/2007 | Stamenkovic | |
| 7,477,359 B2 | 1/2009 | England et al. | |
| 7,502,688 B2 | 3/2009 | Hirokawa | |
| 7,508,384 B2 | 3/2009 | Zhang et al. | |
| 7,541,974 B2 | 6/2009 | Scherzinger | |
| 7,568,289 B2 | 8/2009 | Burlingham et al. | |
| 7,576,871 B2 | 8/2009 | Storm | |
| 7,586,585 B2 | 9/2009 | Siercks | |
| RE41,175 E | 3/2010 | Vashisth et al. | |
| 7,697,748 B2 | 4/2010 | Dimsdale et al. | |
| 7,742,176 B2 | 6/2010 | Braunecker et al. | |
| 7,751,033 B2 | 7/2010 | Skultety-Betz et al. | |
| 7,895,761 B2 | 3/2011 | Pettersson | |
| 7,908,106 B2 | 3/2011 | Cho | |
| 7,961,322 B2 * | 6/2011 | Skinner et al. | 356/402 |
| 8,265,895 B2 | 9/2012 | Willins et al. | |
| 8,358,810 B2 | 1/2013 | Roberts et al. | |
| 8,364,334 B2 | 1/2013 | Au et al. | |
| 8,374,783 B2 | 2/2013 | Takac et al. | |
| 8,384,914 B2 | 2/2013 | Becker et al. | |
| 8,406,996 B2 | 3/2013 | Loomis | |
| 8,719,474 B2 | 5/2014 | Ossig et al. | |
| 2005/0243323 A1 | 11/2005 | Hsu et al. | |
| 2006/0006309 A1 | 1/2006 | Dimsdale et al. | |
| 2006/0061545 A1 | 3/2006 | Hughes et al. | |
| 2007/0038409 A1 | 2/2007 | Gilson et al. | |
| 2008/0033645 A1 | 2/2008 | Levinson et al. | |
| 2009/0183929 A1 | 7/2009 | Zhang et al. | |
| 2009/0279107 A1 | 11/2009 | Deliwala | |
| 2012/0033069 A1 | 2/2012 | Becker et al. | |
| 2012/0069352 A1 | 3/2012 | Ossig et al. | |
| 2012/0188559 A1 | 7/2012 | Becker et al. | |
| 2013/0070250 A1 | 3/2013 | Ditte et al. | |

FOREIGN PATENT DOCUMENTS

| | | |
|---|---|---|
| DE | 102009015922 A1 | 10/2010 |
| EP | 2322901 A2 | 5/2011 |
| WO | 9960525 A1 | 11/1999 |
| WO | 2006014445 A1 | 2/2006 |
| WO | 2006124717 A2 | 11/2006 |
| WO | 2011029140 A1 | 3/2011 |

OTHER PUBLICATIONS

Fatt, Mak Poh; FARO Laser Scanner Focus 3D X 330; Product Release Information; Oct. 8, 2013; 1-9 pgs.

German Office Action for Application No. 10 2013 110 581.5, dated Apr. 29, 2014, 6 pages.

I2C Precision Altimeter, Freescale Semiconductor, Data Sheet: Advance Information, Doc. No. MPL3115A2, Rev 2, Apr. 2012; 1-44 pgs.

* cited by examiner

DIRECTED REGISTRATION OF THREE-DIMENSIONAL SCAN MEASUREMENTS USING A SENSOR UNIT

CROSS-REFERENCE TO RELATED APPLICATIONS

The present application claims the benefit of German Patent Application No. DE 10 2013 110 581.5, filed Sep. 24, 2013, the contents of which are hereby incorporated by reference in their entirety.

BACKGROUND OF THE INVENTION

U.S. Published Patent Application No. 2012/0069352 describes automatic registration, which may be applied to a laser scanner. To scan a scene from different directions of view, the laser scanner is set up at different positions, from each of which one scan is generated. To register the different scans of the scene in a common coordinate system, the centers of the scans for the different laser scanner positions, which are taken by the laser scanner while scanning the scene, must be determined. Typically, targets in overlapping areas of the scans, from which the centers can be computed, are localized and identified.

Further it is known, e.g., from EP 2 322 901 A2, to use inertial measurement units in combination with GPS receivers for mobile scanning, where a pair of two-dimensional (2D) laser scanners are mounted on a car and are moved during the scan.

The type of scanner described herein is a time-of-flight (TOF) scanner that determines distance to an object based at least in part on a speed of light in air. Two common modes of operation available to a TOF scanner are a spherical mode and a helical mode. In the spherical mode, the laser scanner is fixed in position to begin a scanning procedure in which it steers a beam of light about two axes. As the beam is steered, a distance meter in the scanner measures distances and two angle measuring devices measure angles so that three-dimensional (3D) coordinates to points in the environment may be determined. In the helical mode, sometimes referred to as the mobile scanning mode, the laser scanner is moved along a path while it scans by steering a beam of light about a single axis.

In the scanning mode, it is usually necessary to move the scanner to measure multiple regions. Such regions are registered together in a single 3D scan image through the use of registration features, which may be registration targets or natural features in the environment. In most cases today, such registration is carried out in a relatively lengthy post-processing step following the collection of the scan data.

In the helical mode, the scanner is being continually moved to different regions. Such regions must likewise be tied together to provide dimensional information in all three dimensions. Because the scanner does not ordinarily directly measure movement along the direction of moving in the helical mode, some method and/or device is needed to obtain dimensional information along this direction.

Generally, there is a need today for improved methods of determining scanner movement. In the scanning mode, the movements occur between scans and, in the helical mode, the movement occur during scans.

Accordingly, while existing 3D scanners are suitable for their intended purposes, what is needed is a 3D scanner having certain features of embodiments of the present invention.

BRIEF DESCRIPTION OF THE INVENTION

According to an aspect of the invention, a method is provided for optically scanning and measuring an object in an environment with a laser scanner, the method including providing the laser scanner having integral components that include a light emitter, a light receiver, a first angle measuring device, a second angle measuring device, a control and evaluation unit, and a sensor unit, the sensor unit including at least an accelerometer and a gyroscope; moving the laser scanner to a first position and a first orientation in the environment; for each of a plurality of first object points: measuring a first angle with the first angle measuring device; measuring a second angle with the second angle measuring device; emitting with the light emitter an emission light beam; reflecting the emission light beam from the object to produce a reception light beam; receiving with the light receiver the reception light beam and obtaining a first electrical signal in response; determining with the control and evaluation unit a distance based at least in part on the first electrical signal and on a speed of light in air; determining with the control and evaluation unit first 3D coordinates of the first object points in a first instrument frame of reference, the 3D coordinates based at least in part on the first angles, the second angles, and the distances to the plurality of object points on the object; determining a preferred displacement value and a displacement tolerance; taking initial readings from the sensor unit; moving the laser scanner from the first position to a second position by incremental steps, at each incremental step: taking current readings of the sensor unit; calculating a measured sensor displacement based at least in part on the current readings of the sensor unit and the initial readings of the sensor unit; stopping movement of the laser scanner at the second position when the measured sensor displacement is within the displacement tolerance of the preferred displacement value; for each of a plurality of second object points: measuring the first angle with the first angle measuring device; measuring the second angle with the second angle measuring device; emitting with the light emitter the emission light beam; reflecting the emission light beam from the object to produce the reception light beam; receiving with the light receiver the reception light beam and obtaining the first electrical signal in response; determining with the control and evaluation unit the distance based at least in part on the first electrical signal and on a speed of light in air; determining with the control and evaluation unit second 3D coordinates of the object in a second instrument frame of reference, the 3D coordinates based at least in part on the first angles, the second angles, and the distances to the plurality of object points on the object; registering the first 3D coordinates and the second 3D coordinates into a common set of 3D coordinates in a common frame of reference based at least in part on the first 3D coordinates, the second 3D coordinates, and the measured sensor displacement; and storing the common set of 3D coordinates.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The present invention includes ways of improving accuracy and reducing post-processing time for the making of laser scanner measurements through methods involving inertial sensors found within a sensor unit (SU) as described further hereinbelow.

Figure 1:
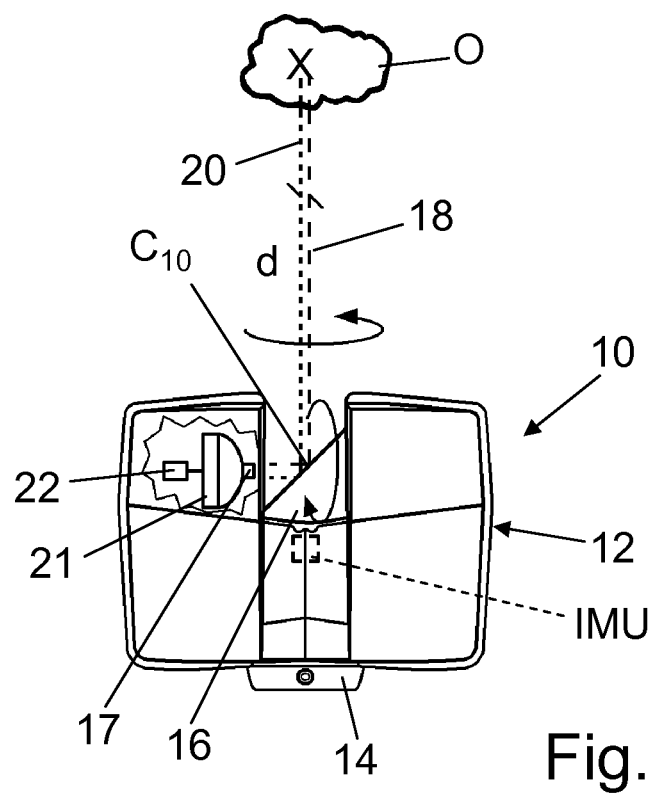
FIG. 1 is a schematic illustration of the laser scanner in operation.
Figure 2:
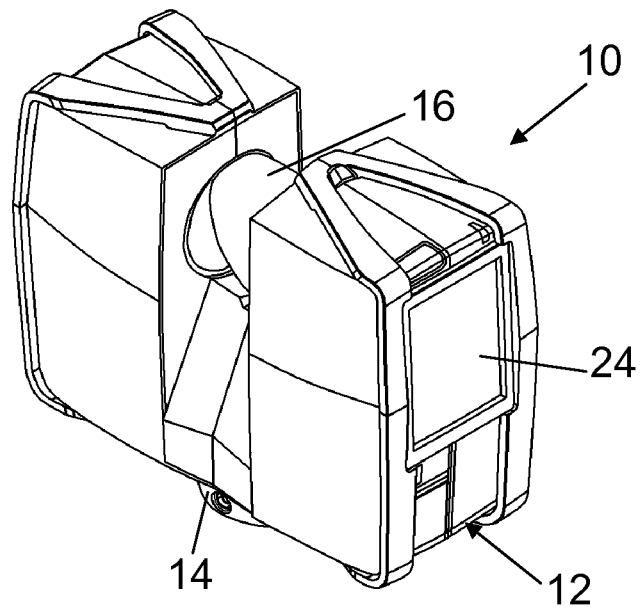
FIG. 2 is a perspective view of the laser scanner.

As shown in FIGS. 1 and 2, a laser scanner 10 is provided as a device for optically scanning and measuring an environment of the laser scanner 10. The laser scanner 10 has a measuring head 12 and a base 14. The measuring head 12 is mounted on the base 14 as a unit that can be rotated about a vertical axis. The measuring head 12 has a mirror 16, which can be rotated about a horizontal axis. The intersection point of the two axes of rotation is designated center $C_{10}$ of the laser scanner 10.

The measuring head 12 is further provided with a light emitter 17 for emitting an emission light beam 18. The emission light beam 18 is preferably a laser beam in the range of approximately 300 to 1600 nm wave length, for example 1550 nm, 905 nm, 790 nm or less than 400 nm, on principle, also other electro-magnetic waves having, for example, a greater wave length can be used, however. The emission light beam 18 is amplitude-modulated with a modulation signal. The emission light beam 18 is emitted by the light emitter 17 onto the mirror 16, where it is deflected and emitted to the environment. A reception light beam 20 which is reflected in the environment by an object O or scattered otherwise, is captured again by the mirror 16, deflected and directed onto a light receiver 21. The direction of the emission light beam 18 and of the reception light beam 20 results from the angular positions of the mirror 16 and the measuring head 12, which depend on the positions of their corresponding rotary drives which, in turn, are registered by one encoder each.

A control and evaluation unit 22 has a data connection to the light emitter 17 and to the light receiver 21 in measuring head 12, whereby parts of it can be arranged also outside the measuring head 12, for example as a computer connected to the base 14. The control and evaluation unit 22 is configured to determine, for a multitude of measuring points X, the distance d between the laser scanner 10 and the (illuminated point at) object O, from the propagation time of emission light beam 18 and reception light beam 20. For this purpose, the phase shift between the two light beams 18, 20 can be determined and evaluated, for example.

A display unit 24 is connected to the control and evaluation unit 22. The display unit 24 in the present case is a display at the laser scanner 10, alternatively it can, however, also be the display of a computer which is connected to the base 14.

In the spherical mode, scanning takes place along a circle by means of the relatively quick rotation of the mirror 16. By virtue of the relatively slow rotation of the measuring head 12 relative to the base 14, the whole space is scanned step by step, by the circles. The entirety of measuring points X of such a measurement defines a scan. For such a scan, the center $C_{10}$ of the laser scanner 10 defines the origin of the local stationary reference system. The base 14 rests in this local stationary reference system.

Connection between the laser scanner, parts of the control and evaluation unit which are arranged outside the measuring head, where appropriate, a display unit on a computer which is connected to the laser scanner, where appropriate, further computers which are incorporated in the system and the SU, can be carried out by wire or wireless, for example by a WLAN.

In addition to the distance d to the center $C_{10}$ of the laser scanner 10, each measuring point X comprises brightness information which is determined by the control and evaluation unit 22 as well. The brightness value is a grey-tone value which is determined, for example, by integration of the band-pass-filtered and amplified signal of the light receiver 21 over a measuring period which is assigned to the measuring point X. Through use of a color camera, images by which colors (R, G, B) can be assigned to the measuring points as values, can be generated optionally.

A SU includes elements of an inertial measurement unit (IMU), namely accelerometers and gyroscopes, and may in addition include magnetometers, pressure sensors, and global positioning systems (GPS). Accelerometers, which also serve as inclinometers, may be three-axis accelerometers that provide acceleration and inclination information in three dimensions. Gyroscopes may be three-axis gyroscopes that measure rotational velocity in three dimensions. Magnetometers provide heading information, that is, information about changes in direction in a plane perpendicular to the gravity vector. Because magnetometers are affected by magnetic fields, their performance may be compromised in industrial environments by the relatively large magnetic fields generated by motors and other industrial equipment. Pressure sensors, which also serve as altimeters, may be used to determine elevation, for example, to determine a number of a floor within a multi-story building. GPS sensors and other related sensors such as GLONASS measure locations anywhere on earth. Accuracy of such sensors varies widely depending on the implementation. A potential problem with GPS is the potential for it being blocked inside buildings. Indoor GPS, which does not actually use the global positioning system, is becoming available in different forms today to provide location information when GPS is blocked by buildings. The sensors described hereinabove may be used separately or combined together in a single SU. The data provided multiple sensors within an SU may be processed using Kalman filters and other mathematical methods to improve calculated values for position and orientation of the SU over time.

As explained hereinabove, a single scan of a scene may be obtained by measuring the environment of the laser scanner 10 in the spherical mode. In general, large volumes or complex spatial structures or objects O, for example, having multiple undercuts, require multiple scans with the scanner located in different positions. In an embodiment, the laser scanner 10 is moved to a plurality of scan centers $C_i$ on a mobile tripod T. The process of placing the scans collected at the different $C_i$ locations in a common coordinate system is referred to as registration.

To register the different scans of the scene, the centers $C_i$ must be determined for the different positions of the laser scanner 10. For this purpose, targets in overlapping areas of the scans enable the centers $C_i$ can be computed, localized and identified in advance, as explained in U.S. Published Patent Application No. 2012/0069352. According to embodiments of the present invention, the laser scanner 10 is provided with an SU, which is connected with the control and evaluation unit 22.

The SU measures at least angular velocities (with gyroscopes) and accelerations (with accelerometers) in the three different spatial directions, so that changes in angular and translational positions of the laser scanner 10 are recognized and measured (tracked). The control and evaluation unit 22 can then compute the coordinates of a scanner center Ci relative to the previously occupied scanner center Ci. The scan, i.e., the entirety of its measuring points X, can then be saved together with the determined center Ci and be registered in the common coordinate system. A pre-processing of the data of the SU is possible already in the SU itself. The raw data of the SU can be used as well, however.

Figure 3:
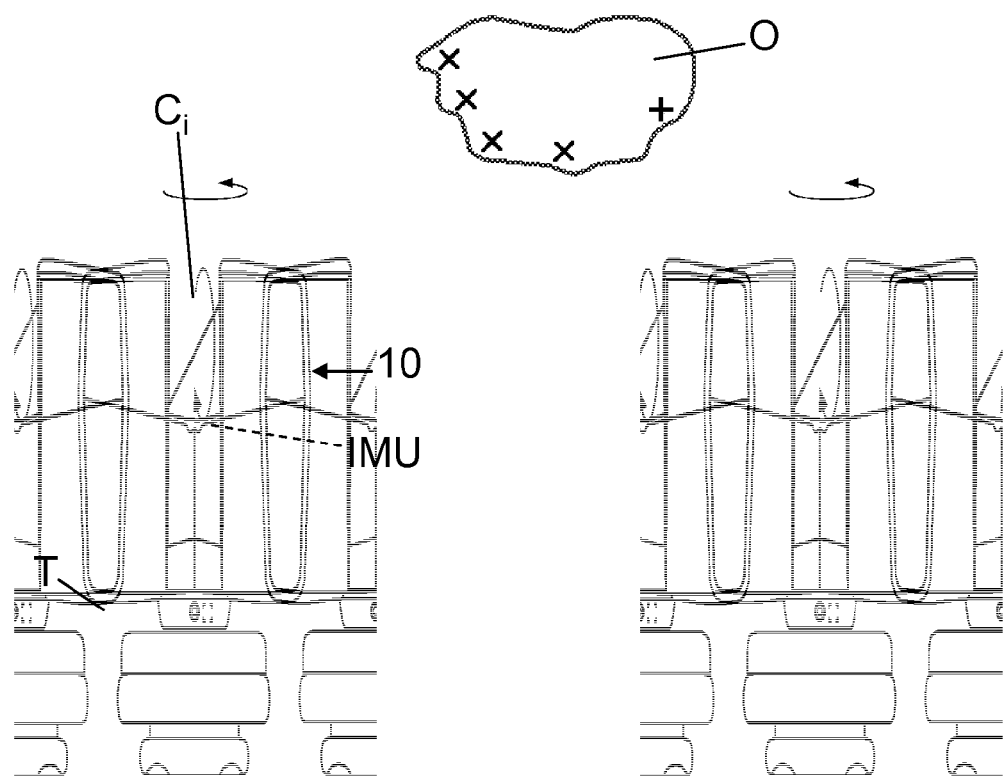
FIG. 3 is a schematic view of the laser scanner measuring a scene in the spherical mode from two different positions, showing a possible arrangement of a sensor unit (SU)

The dimension of the SU may be small enough to allow its integration into the laser scanner 10, i.e., an internal arrangement. Preferably, the SU is arranged in the measuring head 12, as suggested in FIG. 1. The arrangement of the measuring head 12 on the (vertical, first) axis of rotation has the advantage of symmetry, i.e., only the angle or orientation in the horizontal plane changes during operation, so that the SU could be queried to a reduced extent or be completely switched off during operation, without having to eliminate a parallel axis. An alternative internal arrangement is in the base 14, as suggested in FIG. 3. It has the advantage of the SU being completely at rest (i.e., motionless) during operation of the laser scanner 10.

Figure 4:
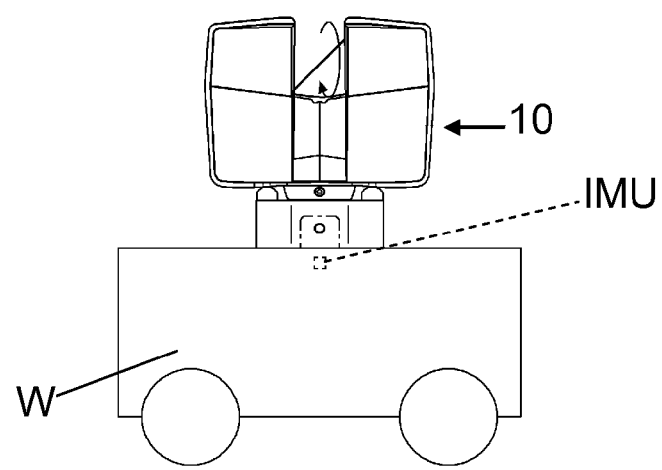
FIG. 4 is a schematic view of the laser scanner measuring a scene in the helical mode, showing a further possible arrangement of the SU.

An external arrangement of the SU is also possible; that is, outside measuring head 12 and base 14, but still as a functional component of the laser scanner 10 and in a fixed spatial arrangement to the base 14 of the laser scanner 10. Possible external arrangements of the SU are, for example, a stand, a tripod T or a trolley W, on which the laser scanner 10 is mounted, which are connected with the base 14, as suggested in FIG. 4. The external arrangement is realized particularly in those cases, in which the SU occupies more installation space than the laser scanner 10 can provide. The connection between an externally arranged SU and the laser scanner is provided, for example, by an interface, as described in U.S. Pat. No. 8,719,474, the disclosure of which is expressly incorporated by reference herein.

Ideally, the accuracy of the SU would be identical or even finer than that of the scan of the laser scanner 10, i.e., a center Ci would be determined precisely enough to allow being placed directly into the common coordinate system, together with the scan generated then (i.e., its measuring points X). If the accuracy of the SU is coarser than that of the scan, however, a comparison of the overlapping areas of the scans is still required for the best possible registration so as to correct, if need be, the center Ci which is determined on the basis of the SU. A determination of the approximate position of the laser scanner 10 only by overlapping areas is the part of the algorithms which is most time-consuming and the most prone to errors. The SU can provide a decisive aid here. The knowledge of the approximate position also opens up possibilities, which otherwise would be impossible due to processing time. For each new scan, centers from the error interval around the determined center Ci can, for example, be selected on a trial basis, if appropriate after filling the gaps between the measuring points X by means of interpolation. Fine alignment can then be carried out by known methods, for example by ICP (Iterative Closest Point).

In addition to the described tracking of a change of position of the laser scanner 10, the SU can also serve to monitor operating conditions during a scan, particularly for image stabilization. Different operating variants, which are correspondingly controlled by the control and evaluation unit 22, are possible for this purpose.

The laser scanner 10 has two operating modes, the above-described spherical mode and helical mode. With the spherical mode, it is conceivable that the control and evaluation unit 22 in principle switches off the SU when operation of the laser scanner 10 starts (i.e., the laser scanner starts scanning), while the center Ci rests, and switches it on again only after operation has been finished.

With the helical mode, the laser scanner 10 is mounted on a trolley W, wherein the measuring head 12 is fixed relative to the base 14. Only the mirror 16 rotates about its (horizontal, second) axis of rotation, so that the laser scanner 10 produces a helical scan when the trolley W moves. Compared to the spherical mode, the center Ci of such a scan changes with the movement of the trolley W. The SU then has the task of capturing the movement of the trolley W (and to thus track the continuous change of position of the laser scanner 10). The current position of the trolley W, i.e., the present center Ci, is then combined with the measuring points X and evaluated and saved together. The SU can be arranged on the trolley W, i.e., external with regard to the laser scanner 10.

The laser scanner 10 can be provided with further sensors, for example thermometers, inclinometers, altimeters, compass/magnetometer, GPS, etc., which are preferably connected to the control and evaluation unit 22, and by which the operating conditions of the laser scanner 10 which are defined by certain parameters, for example geometric orientation or temperature, are monitored. With the evaluation of the GPS receiver, it is also possible to compute the absolute coordinates of the centers Ci from their relative coordinates. By the data from GPS, inclinometer, altimeter and compass, also drift effects of the accelerometers and gyroscopes of the SU can be recognized and minimized. In a preferred embodiment, the sensors may be integrated into the SU.

Preferably, the SU or the computer which evaluates its data estimates the error in tracking the change of position. In an embodiment, if the estimated tracking error reaches a pre-set threshold value (or exceeds it), the SU (or the computer evaluating its data), gives a feedback to the laser scanner 10, in particular to the display unit 24, to trigger a defined restart. Such a defined restart can already consist in the laser scanner 10 being kept at rest, i.e., the acceleration of the SU then equals zero. The defined restart may include a comparison with further measured data, in particular of the laser scanner, by generating, for example, on the occasion of a defined restart, a scan of the current environment or, during the change of position, a continuous scan with an optionally available camera which scans the current environment and with the further sensors, for example GPS. The described restart is preferred for the spherical mode, but it can be used also with helical mode.

The knowledge about the motionlessness of the SU during a scan in the spherical mode can be used for calibrating and compensating drift effects.

Alternatively, a potential movement of the laser scanner 10 during the scan in the spherical mode can be recognized by the SU, so that it is possible to warn of faulty scan data. If sudden and violent movements occur during the change of position of the laser scanner 10, for example due to an impact, such movement can be identified as an important error source by the SU and be communicated to the laser scanner by a feedback. The above described restart, for example, can thus be triggered with a scan at the current position, to eliminate the error source again. The main problem with such an event, like an impact, is to determine potential changes of the direction of movement with a sufficient accuracy. If the laser scanner 10 or the trolley W is on a level ground, the event (for example the impact) should have led at most to a rotation about a vertical axis.

If hence such a problematic spot is recognized (optionally also belatedly), it is still possible to find a correlation between the data before the event and after the event, by a one-dimensional search (in the angle of rotation).

Figure 5:
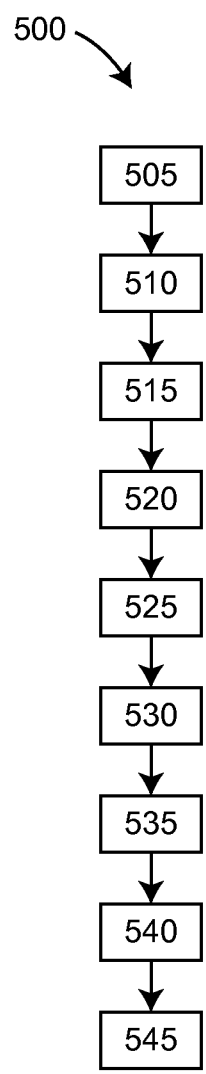
FIG. 5 is a flowchart illustrating steps in a method according to an embodiment.

FIG. 5 shows a flowchart illustrating a method 500 of measuring an object in an environment, with the SU used advantageously to register 3D scan data collected from two different positions. In a step 505, a laser scanner is provided having elements described hereinabove and, in addition, having a sensor unit that includes at least an accelerometer and a gyroscope. In a step 510, the laser scanner is moved to a first position in the environment. In a step 515, the laser scanner measures a plurality of first points and, based on these, determines 3D coordinates as described hereinabove. A step 520 includes determining a preferred displacement value and displacement tolerance. The preferred displacement value may be based on a resulting overlap that would be obtained for successive scans made at different locations. In a step 525, initial readings are taken from the sensor unit. In a step 530, the laser scanner is moved in a series of incremental steps while the sensor unit takes readings to find a measured sensor displacement, which is based on the current sensor readings and the initial sensor readings. When the measured sensor displacement is within the displacement tolerance of the displacement value, the scanner is considered to be correctly positioned and movement is stopped. In a step 535, the laser scanner measures a plurality of second points and, based on these, determines 3D coordinates. In a step 540, first 3D coordinates and second 3D coordinates are registered together based at least in part on the first 3D coordinates, the second 3D coordinates, and the measured sensor displacement. Besides ensuring an adequate overlap of measured points, the measured sensor displacement also provides assistance in making an initial guessing for fitting together the two sets of scan data. In a step 545, the common set of 3D coordinates, which are in a common frame of reference, are stored.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for optically scanning and measuring an object in an environment with a laser scanner, the method comprising:
providing the laser scanner having integral components that include a light emitter, a light receiver, a first angle measuring device, a second angle measuring device, a control and evaluation unit, and a sensor unit, the sensor unit including at least an accelerometer and a gyroscope;
moving the laser scanner to a first position and a first orientation in the environment;
for each of a plurality of first object points:
measuring a first angle with the first angle measuring device;
measuring a second angle with the second angle measuring device;
emitting with the light emitter an emission light beam;
reflecting the emission light beam from the object to produce a reception light beam;
receiving with the light receiver the reception light beam and obtaining a first electrical signal in response;
determining with the control and evaluation unit a distance based at least in part on the first electrical signal and on a speed of light in air;
determining with the control and evaluation unit first three-dimensional (3D) coordinates of the first object points in a first instrument frame of reference, the 3D coordinates based at least in part on the first angles, the second angles, and the distances to the plurality of object points on the object;
determining a preferred displacement value and a displacement tolerance;
taking initial readings from the sensor unit;
moving the laser scanner from the first position to a second position by incremental steps, at each incremental step:
taking current readings of the sensor unit;
calculating a measured sensor displacement based at least in part on the current readings of the sensor unit and the initial readings of the sensor unit;
stopping movement of the laser scanner at the second position when the measured sensor displacement is within the displacement tolerance of the preferred displacement value;
for each of a plurality of second object points:
measuring the first angle with the first angle measuring device;
measuring the second angle with the second angle measuring device;
emitting with the light emitter the emission light beam;
reflecting the emission light beam from the object to produce the reception light beam;
receiving with the light receiver the reception light beam and obtaining the first electrical signal in response;
determining with the control and evaluation unit the distance based at least in part on the first electrical signal and on a speed of light in air;
determining with the control and evaluation unit second 3D coordinates of the object in a second instrument frame of reference, the 3D coordinates based at least in part on the first angles, the second angles, and the distances to the plurality of object points on the object;
registering the first 3D coordinates and the second 3D coordinates into a common set of 3D coordinates in a common frame of reference based at least in part on the first 3D coordinates, the second 3D coordinates, and the measured sensor displacement; and
storing the common set of 3D coordinates.

2. The method of claim 1, wherein in the step of providing the laser scanner, the sensor unit further includes a magnetometer.

3. The method of claim 1, wherein in the step of providing the laser scanner, the sensor unit further includes a pressure sensor.

4. The method of claim 1, wherein in the step of providing the laser scanner, the sensor unit further includes a GPS unit.

5. The method of claim 1, wherein in the step of providing the laser scanner, the accelerometer is a three-axis accelerometer.

6. The method of claim 1, wherein in the step of providing the laser scanner, the gyroscope is a three-axis gyroscope.

7. The method of claim 1, wherein in the step of providing the laser scanner, the accelerometer is a microelectromechanical system (MEMS) device and the gyroscope is a MEMS device.

8. The method of claim 1, wherein the object includes a plurality of targets.

9. The method of claim 8, wherein the targets are selected from the group consisting of spheres and checkerboards.

10. The method of claim 8, wherein the targets are natural features.

11. The method of claim 10, wherein the natural features are selected from the group consisting of edges, planes, and corners.

12. The method of claim 1, wherein, in the step of determining a preferred displacement value, the preferred displacement value is based at least in part on an expected overlap of regions scanned by the laser scanner from the first position and the second position.

\* \* \* \* \*